(12) United States Patent
Li et al.

(10) Patent No.: US 10,936,636 B2
(45) Date of Patent: Mar. 2, 2021

(54) COLLECTING USER INFORMATION FROM COMPUTER SYSTEMS

(71) Applicant: Advanced New Technologies Co., Ltd., George Town (KY)

(72) Inventors: Hui Li, Shanghai (CN); Guanhai Zhong, Shanghai (CN); Yingping Cao, Shanghai (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 15/643,963

(22) Filed: Jul. 7, 2017

(65) Prior Publication Data

US 2018/0011928 A1 Jan. 11, 2018

(30) Foreign Application Priority Data

Jul. 7, 2016 (CN) .......................... 201610532453.8

(51) Int. Cl.
*G06F 16/00* (2019.01)
*G06F 16/33* (2019.01)
*G06F 16/335* (2019.01)
*H04L 29/08* (2006.01)

(52) U.S. Cl.
CPC .......... *G06F 16/334* (2019.01); *G06F 16/337* (2019.01); *H04L 67/22* (2013.01)

(58) Field of Classification Search
CPC ......... G06F 17/30675; G06F 17/30702; H04L 67/22
See application file for complete search history.

(56) References Cited

U.S. PATENT DOCUMENTS

| | | | | |
|---|---|---|---|---|
| 9,049,117 | B1* | 6/2015 | Nucci | ................... H04L 63/302 |
| 9,449,056 | B1* | 9/2016 | Deng | .................... G06F 16/334 |
| 2002/0083062 | A1* | 6/2002 | Neal | ................. G06F 17/30864 |
| 2005/0004799 | A1* | 1/2005 | Lyudovyk | ............... G10L 15/00 |
| | | | | 704/254 |
| 2005/0097150 | A1* | 5/2005 | McKeon | ........... G06F 17/30592 |
| 2007/0033005 | A1 | 2/2007 | Cristo et al. | |

(Continued)

FOREIGN PATENT DOCUMENTS

| | | |
|---|---|---|
| CN | 103020230 | 4/2013 |
| GB | 2532538 | 5/2016 |

(Continued)

OTHER PUBLICATIONS

International Search Report and Written Opinion of the International Searching Authority issued in PCT/US2017/041134 dated Oct. 2, 2017; 9 pages.

(Continued)

*Primary Examiner* — Shew Fen Lin
(74) *Attorney, Agent, or Firm* — Fish & Richardson P.C.

(57) ABSTRACT

Textual information related to user information from user service information is identified. A layered matching is performed on the textual information based on preset background identification information in a preset list, wherein the layered matching includes different matching methods, and the preset list includes a plurality of entries storing different preset background identification information related to the user information. The user information is determined based on the layered matching.

12 Claims, 6 Drawing Sheets

(56) References Cited

U.S. PATENT DOCUMENTS

| | | | |
|---|---|---|---|
| 2009/0006394 A1* | 1/2009 | Snapp | G06F 16/2468 |
| 2009/0119581 A1* | 5/2009 | Velusamy | G06F 17/276 |
| | | | 715/256 |
| 2011/0238591 A1* | 9/2011 | Kerr | G06Q 10/06 |
| | | | 705/321 |
| 2013/0132358 A1* | 5/2013 | Nikankin | G06Q 40/02 |
| | | | 707/706 |
| 2014/0122988 A1* | 5/2014 | Eigner | H04L 67/30 |
| | | | 715/226 |
| 2015/0032738 A1* | 1/2015 | Nachnani | G06F 16/285 |
| | | | 707/723 |
| 2016/0162969 A1* | 6/2016 | Dotterer | G06F 17/30867 |
| | | | 705/26.62 |
| 2017/0046622 A1* | 2/2017 | Gaither | G06F 17/2795 |
| 2018/0262878 A1* | 9/2018 | Zheng | H04W 4/21 |

FOREIGN PATENT DOCUMENTS

| | | |
|---|---|---|
| JP | 2008234175 | 10/2008 |
| JP | 2009009295 | 1/2009 |
| TW | 201437944 | 10/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

European Extended Search Report in European Application No. 17824995.9, dated Apr. 1, 2019, 9 pages.

Pennacchiotti et al., "Democrats, republicans and starbucks aficionados: user classification in twitter," Proceedings of the 17th ACM SIGKDD international conference on Knowledge discovery and data mining, 2011, 430-438.

PCT International Preliminary Report on Patentability Chapter II in International Application No. PCT/US2017/041134, dated Jul. 25, 2018, 8 pages.

* cited by examiner

COLLECTING USER INFORMATION FROM COMPUTER SYSTEMS

CROSS REFERENCE TO RELATED APPLICATIONS

This application claims priority to Chinese Application No. 201610532453.8, filed on Jul. 7, 2016, the entire contents of which are hereby incorporated by reference.

TECHNICAL FIELD

The present disclosure relates to collecting user information from computer systems, particularly from mobile and related computing systems.

BACKGROUND

Given the ongoing development in and use of Internet technologies, especially related to mobile computing devices, functions, and related technology, the amount of data being generated is exponentially increasing. Extracted user information (for example, user background or other information) from the generated data can be useful for organizations and other entities. For example, the extracted user information can provide valuable data useful for various entity decisions and operation.

SUMMARY

The present disclosure describes methods and systems, including computer-implemented methods, computer program products, and computer systems for collecting user information from computer systems, particularly from mobile and related computing systems.

In an implementation, textual information related to user information from user service information is identified. A layered matching is performed on the textual information based on preset background identification information in a preset list, wherein the layered matching includes different matching methods, and the preset list includes a plurality of entries storing different preset background identification information related to the user information. The user information is determined based on the layered matching.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/instructions stored on the non-transitory, computer-readable medium.

The subject matter described in this specification can be implemented in particular implementations, so as to realize one or more of the following advantages. First, the described approach can be used to automatically collect user information (for example, user background information, such as a user's current employer, address, phone number, birthday, educational background, spending patterns, travel data, associates, and organizational affiliations, or other information) by performing layered-type matching approach based on textual information acquired from user service information and a preset background identification information list. The layered matching can include different matching methods for extracting user information from textual information. The layered matching also allows matching methods to be selected to permit matching of textual information of differing quality (for example, structured/organized or free-form textual information, whether acquired from known or unknown sources). Second, the described approach can improve the efficiency of user background information collection by reducing the need for manual information entry by the user. Third, the described approach can provide user information in a defined standard format, for example, providing universities' official names instead of abbreviated versions of the official names. Third, the described approach can be integrated with mobile internet technologies and online Internet usage activities. Other advantages will be apparent to those of ordinary skill in the art.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
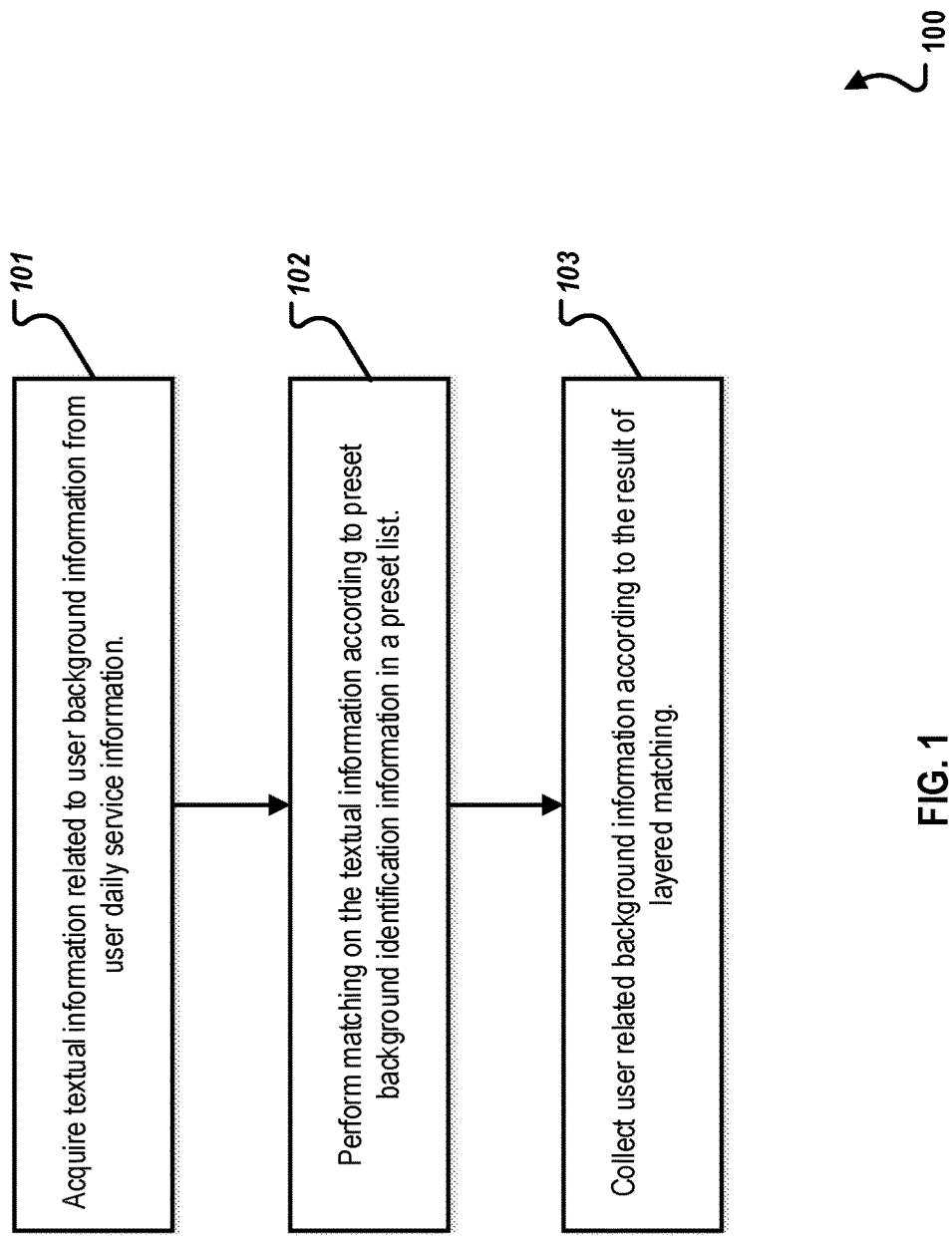
FIG. 1 is a flowchart illustrating an example method for collecting user information, according to an implementation.

The following detailed description describes collecting user information from computer systems, particularly from mobile and related computing systems, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and as such details are within the skill of one of ordinary skill in the art. The present disclosure is not intended to be limited to the described or illustrated implementations, but to be accorded the widest scope consistent with the described principles and features.

Traditional methods for collecting user information (for example, user background information, such as a user's current employer, address, phone number, birthday, educational background, spending patterns, travel data, associates, and organizational affiliations, or other user information) usually requires a user to manually enter the desired information into a computing device (such as, a laptop computer, mobile computing device, or other computing device). For example, when a user applies for a credit card at a bank, the user must normally provide background information, including academic information (such as, a particular school(s) and other academically-related data). The academic information can then be used to extract additional information, for example, a detailed educational background. However, these traditional methods are inefficient to obtain background information for a large number of users. Additionally, the traditional methods are usually performed offline (for example, using pen-and-paper forms or computing devices of limited functionality that are interfaced to a closed network). In light of modern Internet technologies, and particularly with respect to mobile computing devices, the traditional methods are limited and unnecessarily resource intensive (for example, considering the use of bank personnel for form processing, data entry, and the like).

At a high-level, the described approach provides a mechanism to automatically extract user information based on textual information acquired from user services (for example, online shopping, transaction, or chat services). A layered-type matching approach is performed between the acquired textual information and a preset background identification list. The user information is determined based on the result of the layered matching. In some implementations, the layered matching can include different matching methods for extracting user information from the acquired textual information. The layered matching also allows matching methods to be selected to permit matching of textual information of differing quality (for example, structured/organized or freeform textual information, whether obtained from known or unknown sources).

FIG. 1 is a flowchart illustrating an example method 100 for collecting user information, according to an implementation. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At 101, textual information related to user information is acquired using information about from user-applicable services. In some implementations, the user services can include, for example, transaction, remark, registration, or chat services used on a daily basis by the user or from other online services. In some implementations, the textual information includes alpha-numeric, user-readable data. As will be understood by those of ordinary skill in the art, the described approach may also be used with other data types/formats (for example, binary, hexadecimal, and encrypted data) consistent with this disclosure.

The user information can include educational information (for example, schools that the user is currently attending or previously attended), employment information (for example, a user's current or previous employers), or other information consistent with this disclosure. In some implementations, selective configurations can be performed according to service demands. For example, for educational background information, textual information related to school names can be collected from various applicable services, such as a school dormitory registration service, student loan service, campus card charging service, school payment service, and other applicable services. For instance, acquired textual information for a user's educational background could include "Fudan University" or "X campus of Fudan University." For employment background information, textual information related to employer names can be collected from various applicable services, such as user delivery address information, employer address information obtained from delivery services, or other applicable services. From 101, method 100 proceeds to 102.

At 102, a layered matching methodology is performed on the acquired textual information. In some implementations, the layered matching is based on preset background identification information stored in a data store (for example, as a list in a database or flat file). The layered matching operations can include multiple prioritized layers of matching, where each matching layer corresponds to a different matching method(s). In some implementations, the matching methods, the order among the matching methods, the number of the matching methods, or other aspects of performing the layered matching methodology can be configured in a manual or dynamic manner. For example, one or more matching methods can be pre-defined in configuration data or dynamically based on, for example, obtained types, amounts, or quality of textual information. In some implementations, the layered matching can be dynamically adjusted for efficiency (for example, matching speed, exactness, or other reasons consistent with this disclosure).

In some implementations, the preset list can store preset background identification information related to user information. In some implementations, the preset background identification information can include school names, employer names, and other identifying names related to a particular user (or groups of users) and user information. For example, the preset list can include multiple entries, each entry corresponding to a different school name or a different employer name. In some implementations, for educational background information, a nationally standardized list of school names can be obtained from a database (for example, a public, nationally-available database, a private database, or other data source) and provided as the preset list. In cases where schools have closed, merged and changed their names, or in other special situations, the preset list can include the original names of the schools and establish mapped relationships between the original names and the current names. In cases where school names include abbreviations, such as "Beida" (that is, the abbreviation for "Beijing University") and "Zheda" (that is, the abbreviation for "Zhejiang University"), the preset list can include abbreviations of the school names and establish a mapping relationship between abbreviations and the name of the school (for example, a partial name, a full name, or both the full name and the partial name).

In some implementations, different matching methods used by the layered matching methodology can be configured with different matching accuracies. In a typical implementation, different matching methods leveraged for matching according to a descending order of matching accuracies. For example, an exact matching method can be first performed by comparing the acquired textual information with preset background identification information from the preset list. The acquired textual information can be compared with each entry in the preset list for an exact match. If the acquired textual information exactly matches an entry in the preset list (for example, "Beijing University" from the textual information matches exactly with "Beijing University" in the preset list), an exact match is considered to be found and the exact matching result (for example, "Beijing University") is saved in a first result data set. In some implementations, the matched result can be further processed prior to being saved in the first result data set. For example, the further processing can include compression, encryption, encoding, and other processing consistent with this disclosure. In some implementations, the first result data set can be stored in a memory of the computing device that performs the operations of the example method 100 or in another location.

In some implementations, if an exact match cannot be formed, a fuzzy matching method can then be performed on the acquired textual information by determining if the acquired textual information contains or is contained in an entry of the preset list. For example, if the acquired textual information contains or is contained in an entry of the preset list, a fuzzy match can be formed and a corresponding matching relationship retained. For example, if the preset list has an entry of "Fudan University," then the textual information "Fudan" is contained in this entry while the textual information "Fudan University student dormitory" contains this entry. Therefore, both "Fudan" and "Fudan University student dormitory" can fuzzily-match preset list entry "Fudan University." Furthermore, if the acquired textual information can be considered to fuzzily-match one and only one entry of the preset list, a unique fuzzy match can be formed (that is, the fuzzy matching satisfies a uniqueness condition) and the corresponding fuzzy matching result (for example, a school name or an employer name in the one and only one matched preset list entry) can be saved in a second result data set. In some implementations, the uniqueness condition is satisfied if the acquired textual information contains or is contained in one and only one entry of the preset list. In a manner similar to the first result data set, the matched result can be further processed (for example, with compression, encryption, encoding, and other types of processing consistent with this disclosure) prior to being saved in the second result data set. In some implementations, the second result data set can be stored in a memory of the computing device that performs the operations of the example method 100 or in another location.

In some implementation, if a fuzzy matching result cannot be found or a unique fuzzy match cannot be formed, a third type of matching method can be performed on the acquired textual information using a largest common sub-sequence algorithm. In the common sub-sequence algorithm, a string similarity is calculated between the acquired textual information and each entry in the preset list. The entry that is considered to be most similar to the acquired textual information (for example, the entry having the highest string similarity value) can be considered as the matching result and saved in a third result data set. In a manner similar to the first and second result data sets, the matched result can be further processed (for example, with compression, encryption, encoding, and other processing consistent with this disclosure) prior to being saved in the third result data set. In some implementations, the third result data set can be stored in a memory of the computing device that performs the operations of the example method 100 or in another location.

In some implementations, an entry corresponding to a highest similarity value can be considered as a matching result if the similarity value is higher than a defined threshold. In some implementations, this threshold can be manually or dynamically configured based on matching accuracy or other value consistent with this disclosure. In an example, the threshold can have values such as 60%, 70%, or other value. From 102, method 100 proceeds to 103.

At 103, user information is determined based on the result of the layered matching (that is, one or more matching result sets, if applicable) using the acquired textual information. As a specific example, if the school name is determined through the layered matching to be "Beijing University," the school name can be used to determine educational-type background information of the user. In some implementations, the educational background information can include the ranking of the user's school. For example, in some implementations, university ranking information can be stored in a database or a memory of the computing device that performs the operations of the example method 100 or in another location. The ranking of the user's school can be retrieved from the database or a particular memory location. In this example, as Beijing University is considered to be high-ranking university (within the top ten ranked universities in China), a user's educational background can then be considered to be of a relatively higher-quality than other lower-ranked universities. In contrast, if the school name is determined to be of a university of a rank of one-hundred, the user's educational background can be considered to be of a relatively lower-quality than that of "Beijing University." After 103, method 100 stops.

Figure 2:
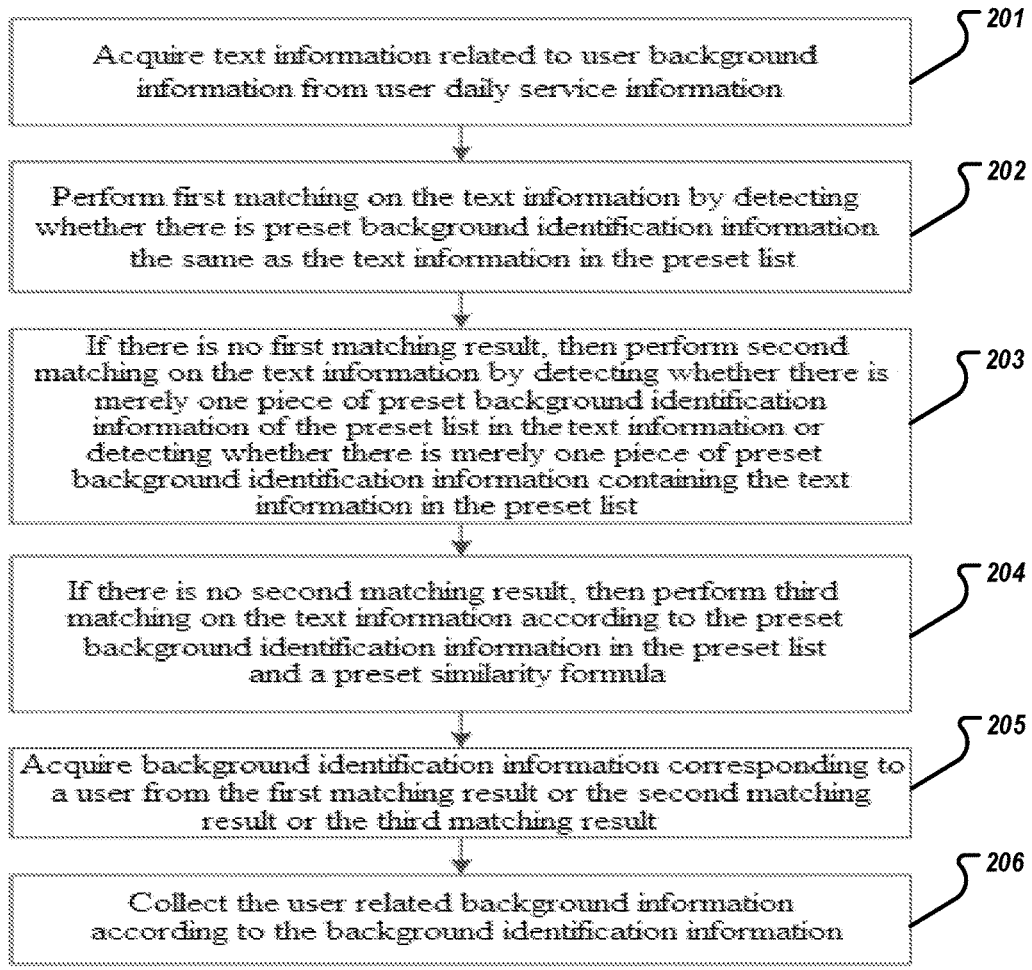
FIG. 2 is an additional flowchart illustrating an example method for collecting user information, according to an implementation.

FIG. 2 is an additional flowchart illustrating a method 200 for collecting user information, according to an implementation. Method 200 is presented as a lower-level view of the operations of method 100 described in FIG. 1. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At 201 (similar to step 101 of FIG. 1), textual information related to user information is acquired from user service information. In some implementations, the textual information acquired from the user services can be trimmed or cleaned, and the layer matching described in step 102 of FIG. 1 and steps 202-204 of FIG. 2 can be performed on the trimmed or cleaned textual information. The trimmed or cleaned textual information can improve the success rate of the layered matching methodology. For example, the textual information acquired from a service is "Zhejiang University of Technology (textbook fee and examination registration fee)." For the textual information to form an exact match with a school name in the preset list, the brackets and the text inside the brackets (that is, "(textbook fee and examination registration fee)") can be deleted to retain a short-form of the textual information (here, "Zhejiang University of Technology") so that an exact match can be formed.

As another example, for the textual information "X campus (branch) of Y University," such as "Shenbei campus of Chinese Medical Science University" and "Qinhuangdao branch of Northeast Petroleum University," the data "X campus (branch) of" in the textual information can be filtered so that the remaining textual information can form an exact match with the preset list. From 201, method 200 proceeds to 202.

At 202, a first matching method can be performed on the acquired textual information by determining whether the acquired textual information exactly matches preset background identification information in the preset list. As discussed in FIG. 1, the preset list stores preset background identification information related to user information, such as school names and employer names. The acquired textual information can be compared with each entry in the preset list. If a textual entry in the preset list is the same as the acquired textual information (for example, "Beijing"="Beijing"), an exact match is indicated and a first matching result is considered obtained. If no entry in the preset list exactly matches the acquired textual information, no first matching result is considered obtained. From 202, method 200 proceeds to 203.

At 203, if the first matching result is not considered obtained, a second matching method can be performed on the acquired textual information by determining whether the acquired textual information contains or is contained in one and only one entry of the preset list. For example, if the acquired textual information is "dormitory building of Beijing University" and contains one and only one entry in the preset school name list (that is, "Beijing University"), then the acquired text can be considered to fuzzily-match the entry "Beijing University" and to satisfy the uniqueness condition. As a result, a second matching result "Beijing University" is considered obtained.

As second example, the acquired textual information is "teaching building of Tsinghua University and dormitory building of Beijing University," and the preset school name list has one entry of "Tsinghua University" and another entry of "Beijing University." In this case, the acquired textual information can be considered to fuzzily-match the preset list but not to satisfy the uniqueness condition, because the acquired textual information contains two entries of the preset list. As a result, no second matching result is considered obtained.

As a third example, if the acquired textual information is "Fudan" and contained in one and only one entry of the preset school name list which is "Fudan University," then the acquired text can be considered to fuzzily-match the entry "Fudan University" and satisfies the uniqueness condition. As a result, a second matching result "Fudan University" is considered obtained.

As a fourth example, the acquired textual information is "Beijing", and the preset school name list has multiple entries containing the acquired text, for example, "Beijing University," "Beijing Institute of Technology," and "Beijing University of Aeronautics and Astronautics." In this case, the acquired textual information can be considered to fuzzily-match the preset list but does not satisfy the uniqueness condition, because the acquired textual information is contained in multiple entries of the preset list. As a result, no second matching result is considered obtained. In some implementations, the second matching method can also determine a matched entry from the preset list for an abbreviated school or employer name.

In some implementations, if a second matching result is considered obtained at 203, the preset list can be updated according to the second matching result. For example, if the second matching result for the acquired textual information "Fudan" is the matched entry "Fudan University," the text "Fudan" (that is, the abbreviation of "Fudan University") can be saved in the preset school name list and linked to the matched non-abbreviated entry "Fudan University." In some implementations, the second matching method can be performed on other acquired textual information using an updated preset list to obtain more first-type or second-type matching results. After the preset list is updated by including the abbreviated school name "Fudan," textual information "Fudan" can be exactly matched for a first-type matching result, and the non-abbreviated entry "Fudan University" linked to the abbreviated entry "Fudan" can be saved in the first result data set. The updated preset list enables a higher-rate of matching between acquired textual information, improves layered matching accuracy, and further improves collection accuracy for user information. From 203, method 200 proceeds to 204.

At 204, if a second matching result is not considered obtained at 203, a third matching method can be performed on the acquired textual information based on the preset background identification information in the preset list and a preset similarity formula. The preset similarity formula can be used to calculate a similarity value that indicates similarity between two strings, word vectors, or other data formats consistent with this disclosure. For example, and as previously discussed, a similarity calculation can be based on a largest common sub-sequence algorithm.

In some implementations, a similarity value is calculated between acquired textual information and each entry of the preset list using a preset similarity formula, and a largest similarity value is determined. For example, if the preset list has 100 entries, 100 similarity values can be computed. The largest similarity value out of the 100 computed similarity values can be determined. If the largest similarity value is greater than or equal to a preset threshold, the entry corresponding to the largest similarity value can be served as a third matching result.

In some implementations, the preset threshold can be manually or dynamically configured based on a desired matching accuracy. For example, the threshold can be 60%, 70%, or some other value. In some cases, the entry in the preset list most similar to the acquired text may not be a correct matching, and the threshold can be used to control matching accuracy to account for this situation. For example, the preset threshold can be a large value for a desired high matching accuracy, and a small value for a low matching accuracy. For instance, a threshold value of 90% requires a high-degree of similarity between the acquired text and an entry in the preset list for the third matching method to be considered successful, while a threshold value of 40% would require a lower degree of similarity between the acquired text and an entry in the preset list for the third matching method to be considered successful.

In some implementations, a largest common sub-sequence algorithm can be used to calculate a similarity value between the acquired textual information and an entry in the preset list. For example, a longest common sub-string length can be calculated for the acquired text and the entry. The similarity value is then computed by dividing the longest common sub-string length by a string length of the entry. For example, the similarity value D(A,B) between acquired textual information A and an entry B in the preset list can, in some implementations, be calculated by the following preset similarity formula:

$$D(A, B) = \frac{\text{longest common sub-string length between } A \text{ and } B}{\text{length of string } B}.$$

In some implementations, the common sub-string length and the entry string length can depend on the particular language of the textual information. For example, if the text is in Chinese, the common sub-string and string lengths can be calculated in the number of Chinese characters. If the text is in English, the sub-string and string lengths can be calculated in the number of words. As an example, consider that the acquired text A is "Tongji dormitory building" with a string length of 3 (three words), and the entry B in the preset school name list is "Tongji University" with a string length of 2 (two words). The longest common sub-string between A and B is "Tongji" with a length of 1, and D(A, B)=½. From 204, method 200 proceeds to 205.

At 205, background identification information for the user can be obtained from the first, second, or third matching result from the three matching methods in steps 202-204. If the layered matching is successful, one of the first, second, or third matching result is considered obtained and can be considered as the background identification information for the user. From 205, method 200 proceeds to 206.

At 206, the user information can be determined based on the background identification information obtained at 205. If, for example, the layered matching is performed on the textual information related to educational background information of a user, and the second matching result is considered obtained, the school name corresponding to the user can be acquired from the second matching result (for example, "Tsinghua University"). The school name can be used to determine the educational background of the user. After 206, method 200 stops.

In some implementations, a large amount of textual information can be acquired that reflects user information. The layered matching and analysis described in step 102 of FIG. 1 or steps 202-204 of FIG. 2 can be performed on all or a subset of the acquired textual information. Further, the matching accuracy of the first matching method can be higher than that of the second matching method, and the matching accuracy of the second matching method can be higher than that of the third matching method.

Figure 3:
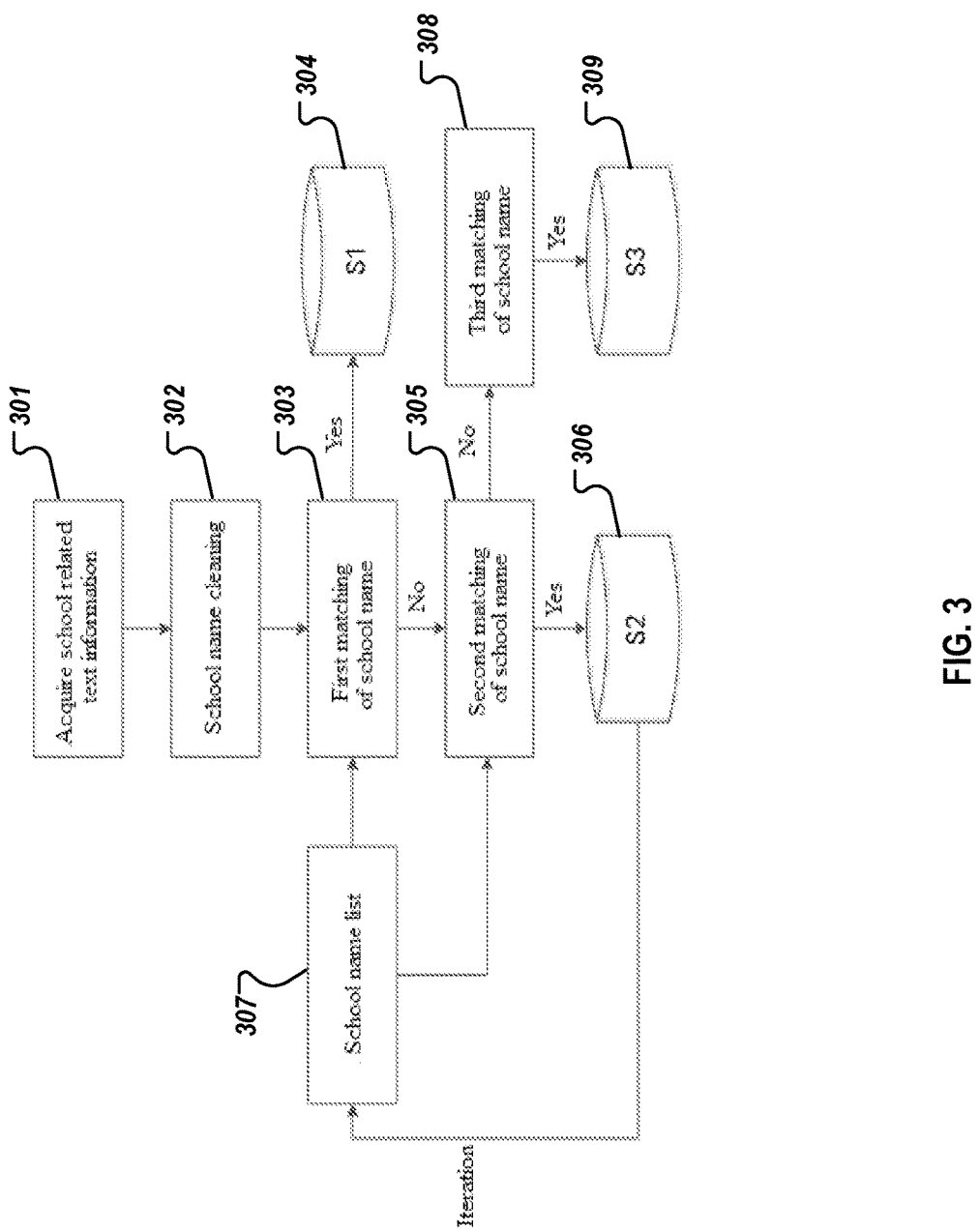
FIG. 3 is an additional flowchart illustrating a specific example method for collecting user information, according to an implementation.

FIG. 3 is an additional flowchart illustrating a specific example method 300 for collecting user information, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At 301, textual information related to a user's educational background is collected from various services, such as the user delivery address information, student loan information, or others. From 301, method 300 proceeds to 302.

At 302, data cleaning is performed on the acquired textual information, as described in step 201 of FIG. 2. The cleaned textual information can be considered a school record. From 302, method 300 proceeds to 303.

At 303, a first matching method (for example, as previously described) is performed. The school record is compared with each school name in a preset school name list. If the school record is the same as a school name in the preset school name list, an exact match is considered to be found and a first matching result (for example, the matched school name from the list) is considered obtained. From 303, method 300 proceeds to 304.

At 304, the first matching result is saved in a first result set S1. From 304, method 300 proceeds to 305.

At 305, if the school record cannot be matched exactly at 303, a second matching method can be performed (for example, as previously described). If the school record contains or is contained in one and only one school name in the preset school name list, the school record can be considered fuzzily-matched and to satisfy the uniqueness condition, and a second matching result (for example, the matched one and only one school name from the preset school name list) is considered obtained. From 305, method 300 proceeds to 306.

At 306, the second matching result is saved in a second result set S2. From 306, method 300 proceeds to 307.

At 307, the school name list is updated according to the second matching result. For example, the school record can be added to the school name preset list and linked to the matched school name. The first and second matching methods can be performed on other unmatched school records based on the updated school name preset list.

At 308, if the school record cannot be matched at 305, a third matching method can be performed using a preset similarity formula. For example, a similarity value can be calculated between the school record and each school name in the school name preset list. In some implementations, if the largest calculated similarity value is greater than or equal to a preset threshold, a third matching result (the school name corresponding to the largest similarity value) is considered obtained. From 308, method 300 proceeds to 309.

At 309, the third matching result is saved in a third result set S3. As a result, the school name corresponding to the user can be acquired from S1, S2, or S3. After 309, method 300 stops.

Figure 4:
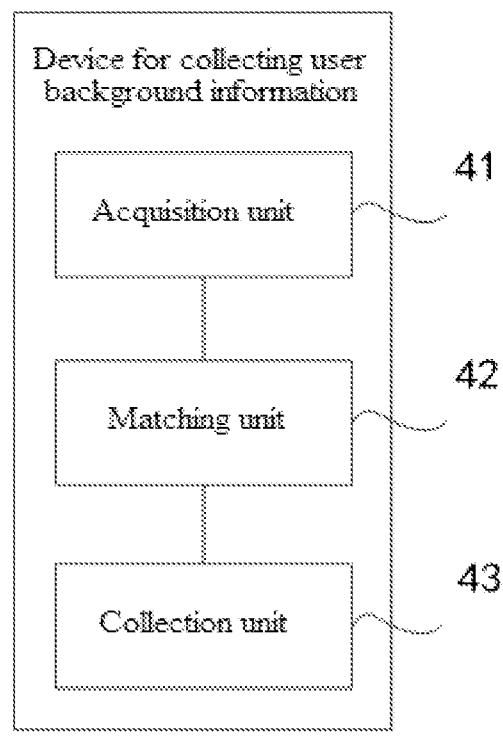
FIG. 4 is a block diagram of illustrating an example computing device for collecting user information, according to an implementation.

FIG. 4 is a block diagram of illustrating an example computing device for collecting user information, according to an implementation. The computing device 400 can include an acquisition unit 41, a matching unit 42 and a collection unit 43, which can be implemented in hardware, software, or both. The acquisition unit 41 can acquire textual information related to user information from user service information, as discussed in step 101 of FIG. 1 and step 201 of FIG. 2. The matching unit 42 can perform a layered matching on the textual information based on preset background identification information in a preset list, as discussed in step 102 of FIG. 1 and steps 202-204 of FIG. 2. The collection unit 43 can collect user information according to the result of the layered matching, as discussed in step 103 of FIG. 1 and steps 205-206 of FIG. 2.

Figure 5:
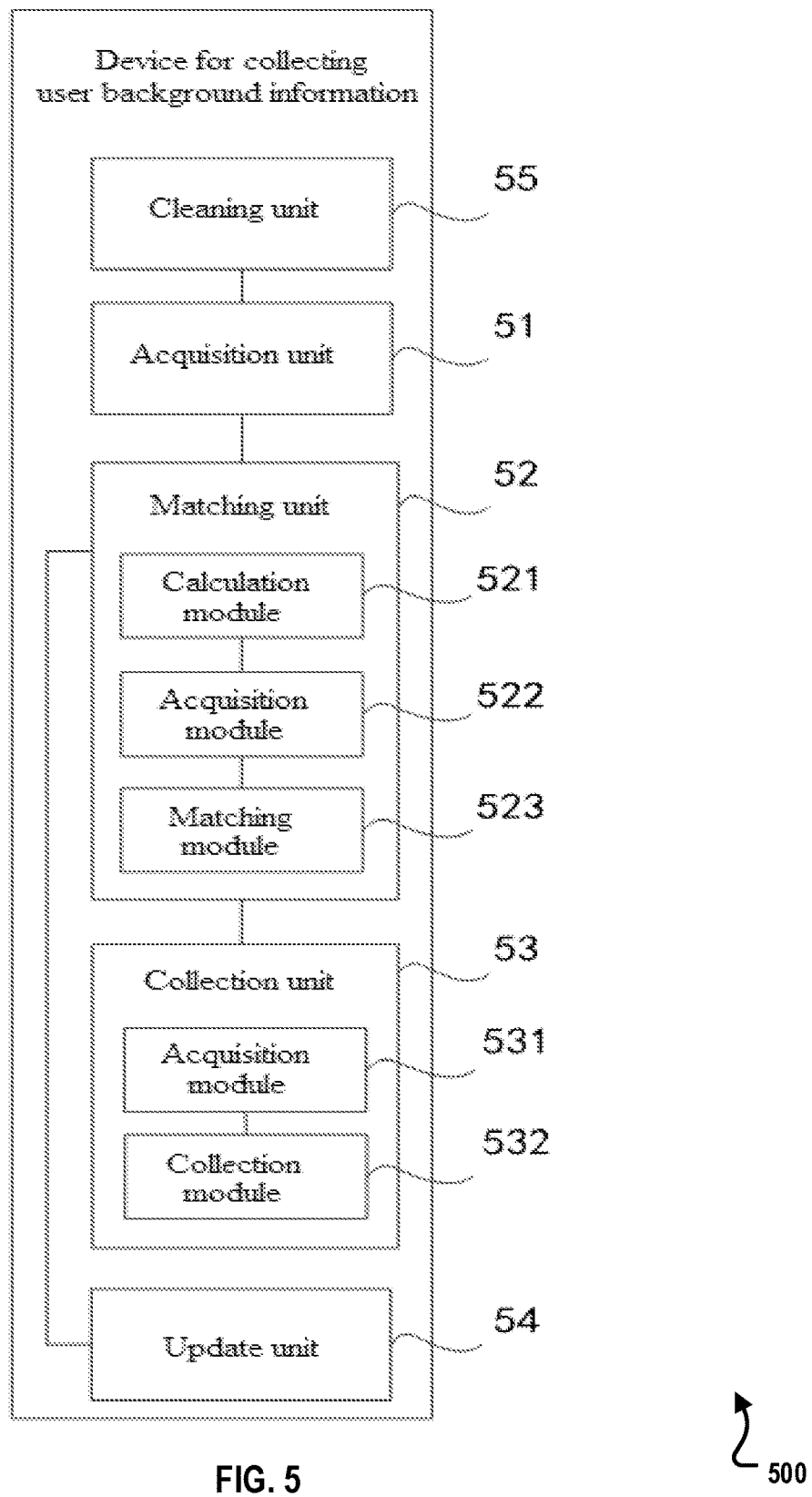
FIG. 5 is another block diagram illustrating an example computing device for collecting user information, according to an implementation.

FIG. 5 is another block diagram illustrating an example computing device 500 for collecting user information, according to an implementation. FIG. 5 is presented as a lower-level view of the components of the example computing device 400 described in FIG. 4.

The computing device 500 can include an acquisition unit 51, a matching unit 52 and a collection unit 53, which can be implemented in hardware, software, or both. The acquisition unit 51 can acquire textual information related to user information from user service information, as discussed in step 101 of FIG. 1 and step 201 of FIG. 2. The matching unit 52 can perform a layered matching on the textual information based on preset background identification information in a preset list, as discussed in step 102 of FIG. 1 and steps 202-204 of FIG. 2. The collection unit 53 can collect user information according to the result of the layered matching, as discussed in step 103 of FIG. 1 and steps 205-206 of FIG. 2.

The matching unit 52 can include a calculation module 521, an acquisition module 522 and a matching module 523, which can be implemented in hardware, software, or both. The calculation module 521 can calculate a similarity value between the textual information and each entry of preset background identification information in the preset list using a preset similarity formula. For example, as discussed previously, the calculation module 521 can calculate the longest common sub-string length between the textual information and the preset background identification information, and divide the longest common sub-string length by the string length of the preset background identification information to obtain the similarity value. The acquisition module 522 can determine the preset background identification information corresponding to the largest similarity value. The matching module 523 can perform the third matching on the textual information by determining whether the largest similarity value is greater than or equal to a preset threshold.

The collection unit 53 can include an acquisition module 531 and a collection module 532, which can be implemented in hardware, software, or both. The acquisition module 531 can acquire background identification information for a user from the first, second, or third matching result. In some implementations, the first, second, or third matching result can be stored in a database or a memory of the computing device 500 or in another location. The collection module 532 can collect the user information according to the background identification information acquired by the acquisition module 531.

The computing device 500 can include an update unit 54, which can be implemented in hardware, software, or both. As discussed previously, if there is any second matching result, the update unit 54 can update the preset list according to the second matching result, for example, by adding the second matching result to the preset list.

The computing device 500 can also include a cleaning unit 55, which can be implemented in hardware, software, or both. As discussed previously, the cleaning unit 55 can perform data cleaning on the textual information. The matching unit 52 can perform layered matching on the cleaned text data.

The computing device 400 or 500 for collecting user information can include at least a processor and a memory. The acquisition unit 41 or 51, the matching unit 42 or 52, the collection unit 43 or 53, the update unit 54, and the cleaning unit 55 can be stored in the memory as program units and executed by the processor to realize corresponding functions. A computer program product, containing one or more instructions executable by a computer can be used to perform method steps described in at least FIGS. 1-3.

Figure 6:
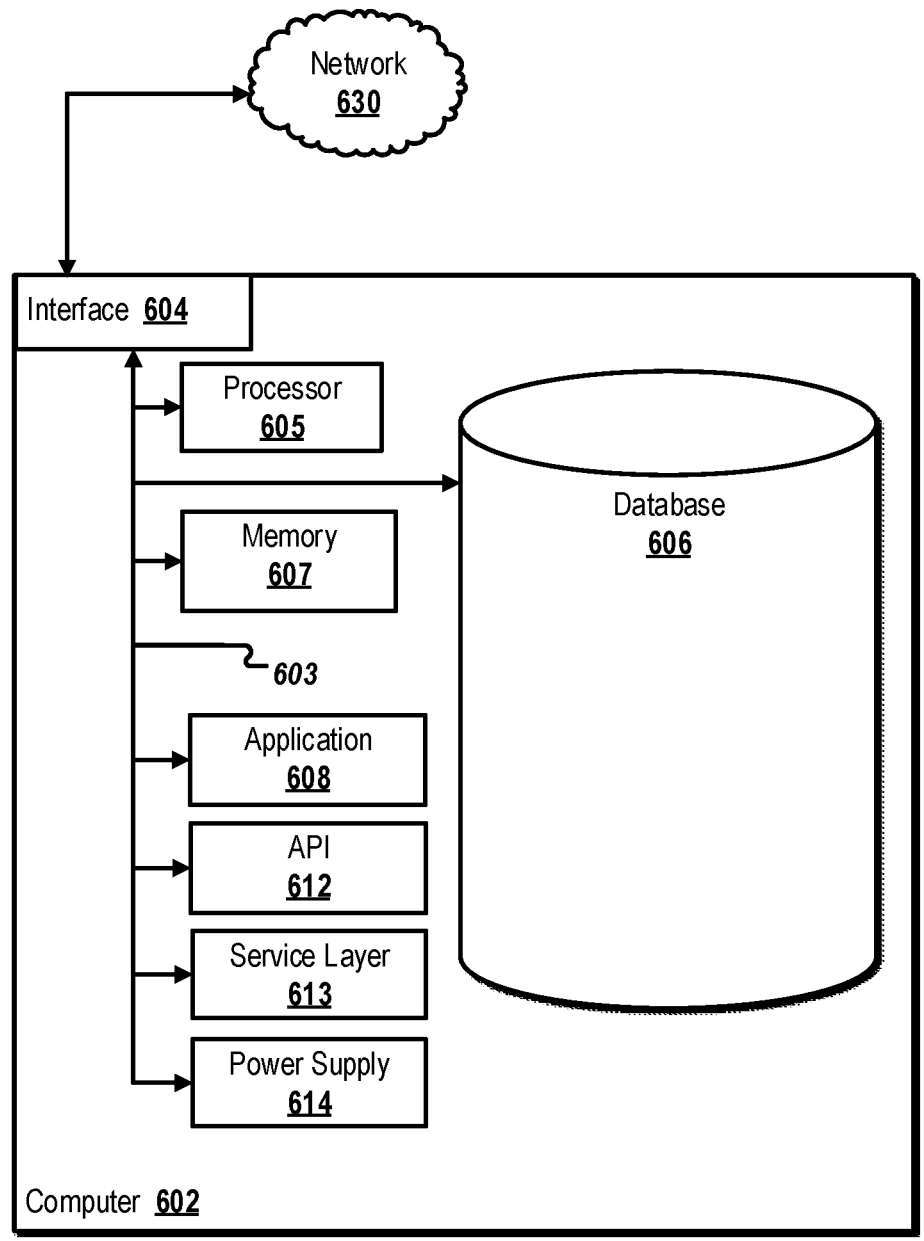
FIG. 6 is a block diagram illustrating an example computer system used to provide computational functionalities associated with described algorithms, methods, functions, processes, flows, and procedures as described in the instant disclosure, according to an implementation.

FIG. 6 is a block diagram of an example computer system 600 used to provide computational functionalities associated with described algorithms, methods, functions, processes, flows, and procedures, as described in the instant disclosure, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602 or other components (or a combination of both) that can be connected to the network 630 (whether illustrated or not). Memory 607 can store any data consistent with this disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power-supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

The described approach for collecting user information from computer systems technically improves conventional collection of user information. For example, the described layered matching approach can be manually or dynamically configured to improve overall matching functionality as part of the collection of user information. Additionally, other technical aspects applicable to the user information collection (such as, data encryption, dynamic/static caching, network throttling, processor management, data storage management, time/geographic location considerations, and computer/database clustering) can be configured (manually or dynamically) in conjunction with the use of the layered matching approach to improve, for example, speed, efficiency, computing resource use, network bandwidth, or computer data storage, As a particular example, one or more methods for the layered matching approach can be selected by one or more components of the described computing systems (for example, in FIG. 4, 5, or 5) to maximize the processing of a server based on the configuration of one or more attributes of the server (such as, processor type, memory amount/speed, and data storage capability). As another example, caching technologies can be leveraged by one or more computing components to increase receipt speed of acquired textual data and to maximize processing ability of the server (for example, processed matches can be processed as quickly as the capability of the server and cached in memory for eventual use by the described computing systems). In addition, the use of caching technologies can help to improve network traffic management and optimization. As another example, as the described approach can be used to increase overall matching efficiency, processing efficiency can be improved and better managed. The increased matching efficiency permits result data to be more quickly determined for use by various components of the described computing systems, faster data returns to users, and more responsive application software and mobile computing devices.

Described implementations of the subject matter can include one or more features, alone or in combination.

For example, in a first implementation, a computer-implemented method, comprising: identifying textual information related to user information from user service information; performing a layered matching on the textual information based on preset background identification information in a preset list, wherein the layered matching includes different matching methods, and the preset list includes a plurality of entries storing different preset background identification information related to the user information; and determining the user information based on the layered matching.

The foregoing and other described implementations can each, optionally, include one or more of the following features:

A first feature, combinable with any of the following features, wherein performing the layered matching on the textual information based on the preset background identification information in the preset list further comprises: performing a first matching on the textual information by determining whether the textual information is the same as one entry in the preset list; in response to an unsuccessful first matching, performing a second matching on the textual information by determining whether the textual information contains or is contained in one and only one entry of the preset list; and in response to an unsuccessful second matching, performing a third matching on the textual information based on the preset background identification information in the preset list and a preset similarity formula.

A second feature, combinable with any of the previous or following features, wherein performing the third matching on the textual information based on the preset background identification information in the preset list and the preset similarity formula further comprises: calculating a similarity value between the textual information and each entry in the preset list using the preset similarity formula; determining a largest similarity value; and determining whether the largest similarity value is greater than or equal to a preset threshold.

A third feature, combinable with any of the previous or following features, wherein calculating the similarity value between the textual information and each entry in the preset list using the preset similarity formula further comprises: calculating a longest common sub-string length between the textual information and that particular entry in the preset list; and dividing the longest common sub-string length by a string length of that particular entry.

A fourth feature, combinable with any of the previous or following features, further comprising, in response to a successful second matching, updating the preset list based on the second matching.

A fifth feature, combinable with any of the previous or following features, wherein determining the user information based on the layered matching further comprises determining the user information based on the first matching, the second matching, or the third matching.

A sixth feature, combinable with any of the previous or following features, further comprising: performing data cleaning on the textual information; and performing the layered matching on the cleaned textual information.

In a second implementation, a non-transitory, computer-readable medium storing one or more instructions executable by a computer system to perform operations comprising: identifying textual information related to user information from user service information; performing a layered matching on the textual information based on preset background identification information in a preset list, wherein the layered matching includes different matching methods, and the preset list includes a plurality of entries storing different preset background identification information related to the user information; and determining the user information based on the layered matching.

The foregoing and other described implementations can each, optionally, include one or more of the following features:

A first feature, combinable with any of the following features, wherein performing the layered matching on the textual information based on the preset background identification information in the preset list further comprises one or more instructions to: perform a first matching on the textual information by determining whether the textual information is the same as one entry in the preset list; in response to an unsuccessful first matching, perform a second matching on the textual information by determining whether the textual information contains or is contained in one and only one entry of the preset list; and in response to an unsuccessful second matching, perform a third matching on the textual information based on the preset background identification information in the preset list and a preset similarity formula.

A second feature, combinable with any of the previous or following features, wherein performing the third matching on the textual information based on the preset background identification information in the preset list and the preset similarity formula further comprises one or more instructions to: calculate a similarity value between the textual information and each entry in the preset list using the preset similarity formula; determine a largest similarity value; and determine whether the largest similarity value is greater than or equal to a preset threshold.

A third feature, combinable with any of the previous or following features, wherein calculating the similarity value between the textual information and each entry in the preset list using the preset similarity formula further comprises one or more instructions to: calculate a longest common sub-string length between the textual information and that particular entry in the preset list; and divide the longest common sub-string length by a string length of that particular entry.

A fourth feature, combinable with any of the previous or following features, wherein the operations further comprise one or more instructions to, in response to a successful second matching, update the preset list based on the second matching.

A fifth feature, combinable with any of the previous or following features, wherein determining the user information based on the layered matching further comprises one or more instructions to determine the user information based on the first matching, the second matching, or the third matching.

A sixth feature, combinable with any of the previous or following features, further comprising one or more instructions to: perform data cleaning on the textual information; and perform the layered matching on the cleaned textual information.

In a third implementation, a computer-implemented system, comprising: a computer memory; and a hardware processor interoperably coupled with the computer memory and configured to perform operations comprising: identifying textual information related to user information from user service information; performing a layered matching on the textual information based on preset background identification information in a preset list, wherein the layered matching includes different matching methods, and the preset list includes a plurality of entries storing different preset background identification information related to the user information; and determining the user information based on the layered matching.

The foregoing and other described implementations can each, optionally, include one or more of the following features:

A first feature, combinable with any of the following features, wherein performing the layered matching on the textual information based on the preset background identification information in the preset list is further configured to: perform a first matching on the textual information by determining whether the textual information is the same as one entry in the preset list; in response to an unsuccessful first matching, perform a second matching on the textual information by determining whether the textual information contains or is contained in one and only one entry of the preset list; and in response to an unsuccessful second matching, perform a third matching on the textual information based on the preset background identification information in the preset list and a preset similarity formula.

A second feature, combinable with any of the previous or following features, wherein performing the third matching on the textual information based on the preset background identification information in the preset list and the preset similarity formula is further configured to: calculate a similarity value between the textual information and each entry in the preset list using the preset similarity formula; determine a largest similarity value; and determine whether the largest similarity value is greater than or equal to a preset threshold.

A third feature, combinable with any of the previous or following features, wherein calculating the similarity value between the textual information and each entry in the preset list using the preset similarity formula further is further configured to: calculate a longest common sub-string length between the textual information and that particular entry in the preset list; and divide the longest common sub-string length by a string length of that particular entry.

A fourth feature, combinable with any of the previous or following features, further configured to, in response to a successful second matching, update the preset list based on the second matching, and wherein determining the user information based on the layered matching is further configured to determine the user information based on the first matching, the second matching, or the third matching.

A fifth feature, combinable with any of the previous or following features, further configured to perform data cleaning on the textual information.

A sixth feature, combinable with any of the previous or following features, further configured to perform the layered matching on the cleaned textual information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLU-RAY (BD), and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    acquiring and identifying, by an acquisition unit of a computing device and as acquired and identified textual information, textual information related to user information from user service information provided by an on-line user-applicable service;
    performing, by a matching unit of the computing device, a layered matching on the acquired and identified textual information based on preset background identification information in a preset list, wherein the layered matching includes a sequence of different matching methods based upon a descending order of matching accuracies, and the preset list includes a plurality of entries storing different preset background identification information related to the user information, the layered matching comprising:
        performing a first matching method based upon a first match accuracy between a first subset of the acquired and identified textual information and the plurality of entries of the preset list to produce a saved first matching method result;
        in response to the saved first match method result from the first matching method, determining a lack of exact match between the first subset of the acquired and identified textual information and the plurality of entries of the preset list;
        in response to determining the lack of exact match, performing a second matching method based upon a second matching accuracy between the first subset of the acquired and identified textual information and the plurality of entries of the preset list to produce a saved second matching method result;
        in response to the saved second matching method result from the second matching method, determining a unique match between the first subset of the acquired and identified textual information and a unique one of the plurality of entries of the preset list, the unique match indicating that the first subset of the acquired and identified textual information contains or is contained in the unique one of the plurality of entries of the preset list;
        in response to determining the unique match, updating the preset list by an updating unit of the computing device, to provide an association between the first subset of the acquired and identified textual information and the unique one of the plurality of entries of the preset list; and
        performing a third matching method based upon a preset similarity formula having a preset similarity threshold between the acquired and identified textual information and the plurality of entries of the preset list to produce a similarity match result, wherein the preset similarity formula comprises:
            determining a type of language of the textual information;
            calculating, based upon the type of language of the textual information, a similarity value between the acquired and identified textual information and each of the plurality of entries in the preset list using the preset similarity formula based on a largest common sub-sequence algorithm;
            determining a largest similarity value; and
            in response to the largest similarity value being greater than or equal to the preset similarity threshold, setting an entry of the plurality of entries in the preset list corresponding to the largest similarity value as the similarity match result;
    determining, by a collection unit of the computing device, the user information based on the saved first matching method result, the saved second matching method result, and the similarity match result of the layered matching; and
    collecting, by the collection unit of the computing device, the determined user information.

2. The computer-implemented method of claim 1, wherein calculating the similarity value between the acquired and identified textual information and each of the plurality of entries in the preset list using the preset similarity formula having the preset similarity threshold comprises:
    calculating a longest common sub-string length between the acquired and identified textual information and that particular entry of the plurality of entries in the preset list; and
    dividing the longest common sub-string length by a string length of that particular entry of the plurality of entries.

3. The computer-implemented method of claim 1, further comprising:
    performing, by a cleaning unit of the computing device and as cleaned textual information, data cleaning on the acquired and identified textual information; and
    performing the layered matching on the cleaned textual information.

4. The computer-implemented method of claim 1, wherein the textual information and the user service information have a same subject configuration.

5. A non-transitory, computer-readable medium storing one or more instructions executable by a computer system to perform operations comprising:
  acquiring and identifying, by an acquisition unit of a computing device and as acquired and identified textual information, textual information related to user information from user service information provided by an on-line user-applicable service;
  performing, by a matching unit of the computing device, a layered matching on the acquired and identified textual information based on preset background identification information in a preset list, wherein the layered matching includes a sequence of different matching methods based upon a descending order of matching accuracies, and the preset list includes a plurality of entries storing different preset background identification information related to the user information, the layered matching comprising:
    performing a first matching method based upon a first match accuracy between a first subset of the acquired and identified textual information and the plurality of entries of the preset list to produce a saved first matching method result;
    in response to the saved first match method result from the first matching method, determining a lack of exact match between the first subset of the acquired and identified textual information and the plurality of entries of the preset list;
    in response to determining the lack of exact match, performing a second matching method based upon a second matching accuracy between the first subset of the acquired and identified textual information and the plurality of entries of the preset list to produce a saved second matching method result;
    in response to the saved second matching method result from the second matching method, determining a unique match between the first subset of the acquired and identified textual information and a unique one of the plurality of entries of the preset list, the unique match indicating that the first subset of the acquired and identified textual information contains or is contained in the unique one of the plurality of entries of the preset list;
    in response to determining the unique match, updating the preset list by an updating unit of the computing device, to provide an association between the first subset of the acquired and identified textual information and the unique one of the plurality of entries of the preset list; and
    performing a third matching method based upon a preset similarity formula having a preset similarity threshold between the acquired and identified textual information and the plurality of entries of the preset list to produce a similarity match result, wherein the preset similarity formula comprises:
      determining a type of language of the textual information;
      calculating, based upon the type of language of the textual information, a similarity value between the acquired and identified textual information and each of the plurality of entries in the preset list using the preset similarity formula based on a largest common sub-sequence algorithm;
      determining a largest similarity value;
      in response to the largest similarity value being greater than or equal to the preset similarity threshold, setting an entry of the plurality of entries in the preset list corresponding to the largest similarity value as the similarity match result;
  determining, by a collection unit of the computing device, the user information based on the saved first matching method result, the saved second matching method result, and the similarity match result of the layered matching; and
  collecting, by the collection unit of the computing device, the determined user information.

6. The non-transitory, computer-readable medium of claim 5, wherein calculating the similarity value between the acquired and identified textual information and each of the plurality of entries in the preset list using the preset similarity formula having the preset similarity threshold comprises one or more instructions to:
  calculating a longest common sub-string length between the acquired and identified textual information and that particular entry of the plurality of entries in the preset list; and
  dividing the longest common sub-string length by a string length of that particular entry of the plurality of entries.

7. The non-transitory, computer-readable medium of claim 5, further comprising one or more instructions to:
  performing, by a cleaning unit of the computing device and as cleaned textual information, data cleaning on the acquired and identified textual information; and
  performing the layered matching on the cleaned textual information.

8. The non-transitory, computer-readable medium of claim 5, wherein the textual information and the user service information have a same subject configuration.

9. A computer-implemented system, comprising:
  a computer memory; and
  a hardware processor interoperably coupled with the computer memory and configured to perform operations comprising:
    acquiring and identifying, by an acquisition unit of a computing device and as acquired and identified textual information, textual information related to user information from user service information provided by an on-line user-applicable service;
    performing, by a matching unit of the computing device, a layered matching on the acquired and identified textual information based on preset background identification information in a preset list, wherein the layered matching includes a sequence of different matching methods based upon a descending order of matching accuracies, and the preset list includes a plurality of entries storing different preset background identification information related to the user information, the layered matching comprising:
      performing a first matching method based upon a first match accuracy between a first subset of the acquired and identified textual information and the plurality of entries of the preset list to produce a saved first matching method result;
      in response to the saved first match method result from the first matching method, determining a lack of exact match between the first subset of the acquired and identified textual information and the plurality of entries of the preset list;
      in response to determining the lack of exact match, performing a second matching method based upon a second matching accuracy between the first subset of the acquired and identified textual information and the plurality of entries of the preset list to produce a saved second matching method result;

in response to the saved second matching method result from the second matching method, determining a unique match between the first subset of the acquired and identified textual information and a unique one of the plurality of entries of the preset list, the unique match indicating that the first subset of the acquired and identified textual information contains or is contained in the unique one of the plurality of entries of the preset list;

in response to determining the unique match, updating the preset list by an updating unit of the computing device, to provide an association between the first subset of the acquired and identified textual information and the unique one of the plurality of entries of the preset list; and performing a third matching method based upon a preset similarity formula having a preset similarity threshold between the acquired and identified textual information and the plurality of entries of the preset list to produce a similarity match result, wherein the preset similarity formula comprises:

determining a type of language of the textual information;

calculating, based upon the type of language of the textual information, a similarity value between the acquired and identified textual information and each of the plurality of entries in the preset list using the preset similarity formula based on a largest common sub-sequence algorithm;

determining a largest similarity value; and in response to the largest similarity value being greater than or equal to the preset similarity threshold, setting an entry of the plurality of entries in the preset list corresponding to the largest similarity value as the similarity match result;

determining, by a collection unit of the computing device, the user information based on the saved first matching method result, the saved second matching method result, and the similarity match result of the layered matching; and collecting, by the collection unit of the computing device, the determined user information.

10. The computer-implemented system of claim 9, wherein calculating the similarity value between the acquired and identified textual information and each of the plurality of entries in the preset list using the preset similarity formula having the preset similarity threshold comprises:

calculating a longest common sub-string length between the acquired and identified textual information and that particular entry of the plurality of entries in the preset list; and dividing the longest common sub-string length by a string length of that particular entry of the plurality of entries.

11. The computer-implemented system of claim 9, further configured to:

performing, by a cleaning unit of the computing device and as cleaned textual information, data cleaning on the acquired and identified textual information; and performing the layered matching on the cleaned textual information.

12. The computer-implemented system of claim 9, wherein the textual information and the user service information have a same subject configuration.

* * * * *